United States Patent
Dohmen

Patent Number: 5,867,352
Date of Patent: Feb. 2, 1999

[54] MAGNETIC TAPE APPARATUS HAVING A MAGNETIC HEAD WITH AT LEAST ONE CLEANING GROOVE THEREON

[75] Inventor: Gerardus M. Dohmen, Eindhoven, Netherlands

[73] Assignee: U.S. Philips Corporation, New York, N.Y.

[21] Appl. No.: 152,557

[22] Filed: Nov. 12, 1993

[30] Foreign Application Priority Data

Nov. 13, 1992 [EP] European Pat. Off. .............. 92203486

[51] Int. Cl.⁶ .................................................. G11B 5/187
[52] U.S. Cl. ..................................... 360/130.21; 360/122
[58] Field of Search .............................. 360/122, 130.21, 360/130.2, 128, 84, 85, 93

[56] References Cited

U.S. PATENT DOCUMENTS

| | | | |
|---|---|---|---|
| 3,643,037 | 2/1972 | Norwood | 360/102 |
| 4,636,898 | 1/1987 | Suzuki et al. | 360/122 |
| 4,809,110 | 2/1989 | Hertrich | 360/122 |
| 4,888,657 | 12/1989 | Lacey et al. | 360/122 |
| 4,956,737 | 9/1990 | Brock | 360/122 |
| 5,153,798 | 10/1992 | Ruigrok et al. | 360/122 |
| 5,289,330 | 2/1994 | Wade | 360/122 |
| 5,313,342 | 5/1994 | Soda et al. | 360/121 |

FOREIGN PATENT DOCUMENTS

| | | | |
|---|---|---|---|
| 0097975 | 1/1984 | European Pat. Off. | 360/122 |
| 0406943 | 1/1991 | European Pat. Off. | 360/94 |
| 0512617 | 11/1992 | European Pat. Off. . | |
| 2503221 | 7/1976 | Germany . | |
| 0004111 | 12/1979 | Japan | 360/122 |
| 0229215 | 10/1986 | Japan | 360/122 |
| 1211308 | 8/1989 | Japan . | |
| 1277308 | 11/1989 | Japan . | |
| 1317261 | 12/1989 | Japan | 360/130.21 |
| 4222909 | 12/1990 | Japan . | |
| 5020625 | 7/1991 | Japan . | |
| 5205209 | 8/1993 | Japan . | |

OTHER PUBLICATIONS

IBM Technical Disclosure Bulletin, Wear–Resistant Coating, vol. 11, No. 10, Mar. 1969, Broch & Hahn.

*Primary Examiner*—Brian E. Miller
*Attorney, Agent, or Firm*—John C. Fox

[57] ABSTRACT

Magnetic head (51) having a contact face (59) for cooperation with a tape face (55a) of a magnetic tape (55). The magnetic head comprises a transducing structure having at least one transducing gap (57) terminating in the contact face. The contact face is provided with at least one cleaning groove for cleaning the tape face, which groove extends parallel to the transducing gap and has at least one wall portion (61a, 62a) oriented at least substantially transversely to the contact face and constituting a scraping edge (61b, 62b) at the contact face.

8 Claims, 3 Drawing Sheets

MAGNETIC TAPE APPARATUS HAVING A MAGNETIC HEAD WITH AT LEAST ONE CLEANING GROOVE THEREON

BACKGROUND OF THE INVENTION

The invention relates to a magnetic head having a contact face for operation with a tape face of a magnetic tape and comprising a transducing structure having at least one transducing gap terminating in the contact face.

A magnetic head of this type is known from U.S. Pat. No. 5,217,819 (herewith incorporated by reference).

The known magnetic head is a thin-film magnetic head which may comprise one or more inductive and/or magnetoresistive transducing elements. The magnetic head is intended for use in a magnetic tape apparatus which forms part of a magnetic tape system comprising two types of magnetic tape cassettes. One type of cassette comprises a magnetic tape on which information is present in an analog form. The other type of cassette comprises a magnetic tape on which information is present in a digital form. The magnetic tape apparatus is suitable for writing information in a digital form and for reading information in a digital form as well as in an analog form, and forms part of a system which is generally known as the DCC system.

It has been found that dust and dirt particles may accumulate on a magnetic tape or that particles may coalesce to form agglutinations. The agglutinations may be formed during standstill of the tape, notably on tape guides present in the cassettes and/or on tape cleaning means, particularly in a humid and/or hot environment. If the agglutinations occur at the tape side of the magnetic tape, which is in contact with the contact face of the magnetic head, the contact between the magnetic tape and the magnetic head may be disturbed, particularly when information is being written and/or read in a digital form, so that an unacceptable number of write and/or read errors is produced. Although the current magnetic tape apparatuses are provided with error correction systems, practice proves that these systems do not always appear to provide an adequate solution to the problem described.

It is to be noted that a self-cleaning head structure having a plurality of head islands raised with respect to a head face is known from U.S. Pat. No. 4,809,110 (herewith incorporated by reference). The head islands which, viewed in the direction of the tape, are arranged one behind the other, are relatively widely spaced apart and each of these islands functions as an individual magnetic head provided with its own convex contact face which is bounded by two slanting side faces. It is further to be noted that U.S. Pat. No. 4,888,657 (herewith incorporated by reference) describes a magnetic head whose head face has two relatively wide slits used for keeping the active head structure separate from tape guides and for inhibiting the occurrence of an air film proximate to the moving magnetic tape.

OBJECTS AND SUMMARY OF THE INVENTION

It is, inter alia, an object of the invention to modify the magnetic head mentioned in the opening paragraph in such a way that also contaminated magnetic tapes can be scanned without any unacceptable output losses.

To this end, the magnetic head according to the invention is characterized in that the contact face is provided with at least one cleaning groove for cleaning the tape face, which groove extends at least substantially parallel to the transducing gap and has at least one wall portion oriented at least substantially transversely to the contact face and constituting a scraping edge at the contact face.

During operation, the scraping edge at the magnetic head according to the invention is transverse to the direction of movement of the magnetic tape to be scanned, ensuring that a side of the magnetic tape moving along the contact face can be cleaned of agglutinations possibly present on the tape before it passes the transducing gap. The dirt which is scraped off is collected in the relatively narrow cleaning groove, which may itself be cleaned after a given period of use of the magnetic head. Although in principle one cleaning groove is sufficient, a cleaning groove may be provided, if desired, at both sides of the transducing gap. It is to be noted that the scraping edge should of course be free from burrs or other irregularities in order to prevent damage of the magnetic tape.

An embodiment of the magnetic head according to the invention is characterized in that the cleaning groove at the contact face has a width dimension of between 100 and 300 $\mu$m. For the sake of clarity it is to be noted that the direction of width of the cleaning groove extends parallel to the direction of movement of the magnetic tape to be scanned. This implies that the width dimension is the dimension which is transverse to the scraping edge. It has been found by experiment that said values for the width dimension are optimum as regards the cleaning function of the groove on the one hand and an optimum tape-head contact on the other hand. A larger groove width may cause the magnetic tape to bend at the area of the cleaning groove. This is particularly the case if means for urging the magnetic tape against the contact face are used.

An embodiment of the head is characterized in that the scraping edge has a radius of curvature of between 1 and 5 $\mu$m. It has been found that such a scraping edge is particularly functional while not risking any damage to the magnetic tape.

An embodiment of the head is characterized in that the contact face is constituted by a wear-resistant layer, which may comprise, for example, $Cr_2O_3$ or CrN, and which inhibits wear due to abrasive action of the magnetic tape passing along the magnetic head during operation. A layer thickness of 20 to 100 nm has been found to be sufficient in this respect.

Since increasingly narrow tracks are used on the magnetic tape in the above-mentioned systems, the systems become more and more sensitive to dust particles on the magnetic tape. The magnetic head according to the invention solves this problem in an efficient manner.

The invention also relates to a method of manufacturing the magnetic head according to the invention, the method characterized by the following consecutive steps:

forming the head face, for example by means of grinding and/or polishing a head structure, providing the cleaning groove, for example by means of a sawing operation, and depositing a wear-resistant material, for example $Cr_2O_3$ or CrN, to form the wear-resistant layer on the head face.

Providing the cleaning groove before forming the wear-resistant layer has the important advantage that the scraping edge of the cleaning groove can be mechanically processed, for example lapped, so as to remove possible burrs.

The invention also relates to a magnetic tape system characterized by a magnetic tape, and a magnetic tape apparatus provided with a magnetic head according to the invention, for writing and/or reading the magnetic tape.

An embodiment of the magnetic tape system according to the invention is characterized in that the magnetic head is provided with first transducing means for scanning information in a digital form on a first type of magnetic tape, and with second transducing means for scanning information in an analog form on a second type of magnetic tape, a magnetic tape cassette being present which comprises magnetic tape guide means defining a first contact face for the first type of magnetic tape and a second contact face for the second type of magnetic tape, the cleaning groove being provided in a contact face portion of the magnetic head at the location where the first and second contact faces do not overlap each other.

This embodiment of the magnetic tape system according to the invention leads to the object of providing the cleaning groove in a magnetic head suitable for scanning two types of magnetic tape in such a way that this cleaning groove is effective for only one of the two types. It will be evident from the foregoing that the cleaning groove is effective for the magnetic tape which is intended for digital recording.

An embodiment of the magnetic tape system according to the invention is characterized in that the magnetic tape cassette is provided with a tape pressure element for urging the magnetic tape against the contact face of the magnetic head. An optimum contact between the tape and the head is achieved by the simultaneous action, during operation, of the narrow cleaning groove and the tape pressure element.

An embodiment of the magnetic tape system according to the invention is characterized in that the magnetic tape apparatus has a drive spindle and the magnetic tape extends between two reels of a magnetic tape cassette, which reels are coupled by means of a drive belt, the magnetic tape cassette being provided with a drive wheel which can be coupled to the drive spindle and cooperates with the drive belt. The use of the magnetic head according to the invention in this known system has the advantage that the magnetic tape can be displaced across the contact face of the magnetic head at a relatively low tape force but at a high speed during writing and/or reading signals.

An embodiment of the magnetic tape system according to the invention is characterized in that during operation the magnetic head can be displaced parallel to the transducing gap with respect to the magnetic tape, while the cleaning groove extends from a first edge to a second edge of the contact face. This provides the possibility of scanning the magnetic tape, which is guided linearly along the magnetic head, with a relatively narrow gap configuration in a number of steps. In other words, the number of transducing gaps of the magnetic head may be much smaller than the number of longitudinal tracks on the magnetic tape.

An embodiment of the magnetic tape system according to the invention is characterized in that the magnetic tape extends between two reels and the magnetic tape apparatus has at least one drive roller and a pressure roller arranged opposite said drive roller for displacing the magnetic tape along the magnetic head, while during operation the magnetic tape passes the cleaning groove and subsequently the transducing gap. Due to the magnetic head or magnetic heads provided according to the invention, this embodiment is particularly suitable as a "high speed" duplicating system.

The invention also relates to a magnetic tape apparatus for use in the magnetic tape system according to the invention.

BRIEF DESCRIPTION OF THE DRAWINGS

The afore-mentioned and other aspects of the invention will be apparent from the embodiments described hereinafter and elucidated with reference to the drawings, in which.

It is to be noted that the Figures are drawn to arbitrary scales which do not always correspond to each other.

DESCRIPTION OF THE PREFERRED EMBODIMENTS

Figure 1:
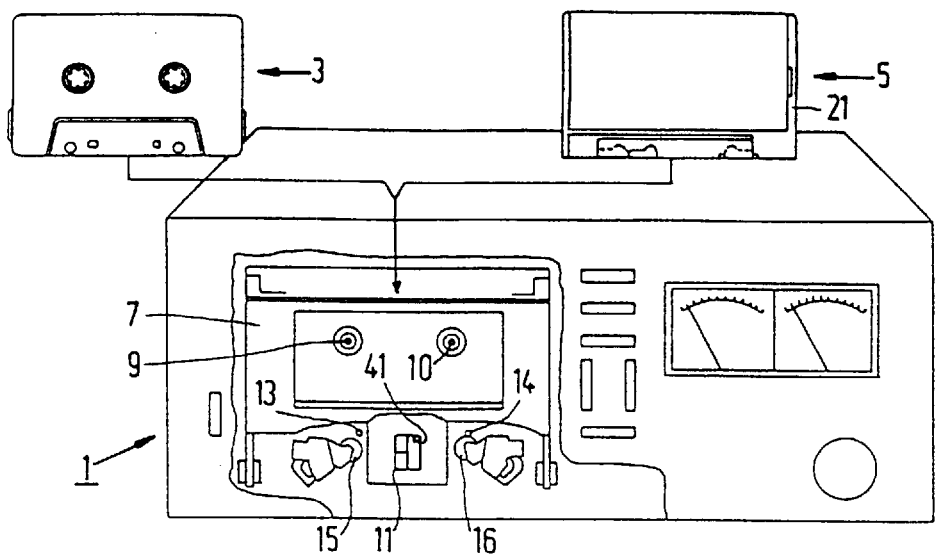
FIG. 1 shows a first embodiment of the magnetic tape system according to the invention including a magnetic tape apparatus and two mutually different magnetic tape cassettes, both being suitable for cooperation with the apparatus.

The magnetic tape system shown in FIG. 1 comprises a magnetic tape apparatus 1, a compact cassette 3 comprising a magnetic tape 34 (see FIG. 4) with information in an analog form, and a DCC cassette 5 comprising a magnetic tape 24 (see FIG. 2) provided with or suitable for storing information in a digital form. The apparatus 1 has a holder 7 for accommodating the cassettes. Two reel spindles 9 and 10 are provided for cooperation with reel hubs of the cassettes. The apparatus is provided with a magnetic head 11 according to the invention, with which both the magnetic tape in the cassette 3 can be read and the magnetic tape in the cassette 5 can be written and read. The apparatus 1 is also provided with two capstans 13 and 14 and two pressure rollers 15 and 16 cooperating with the capstans.

Figure 2:
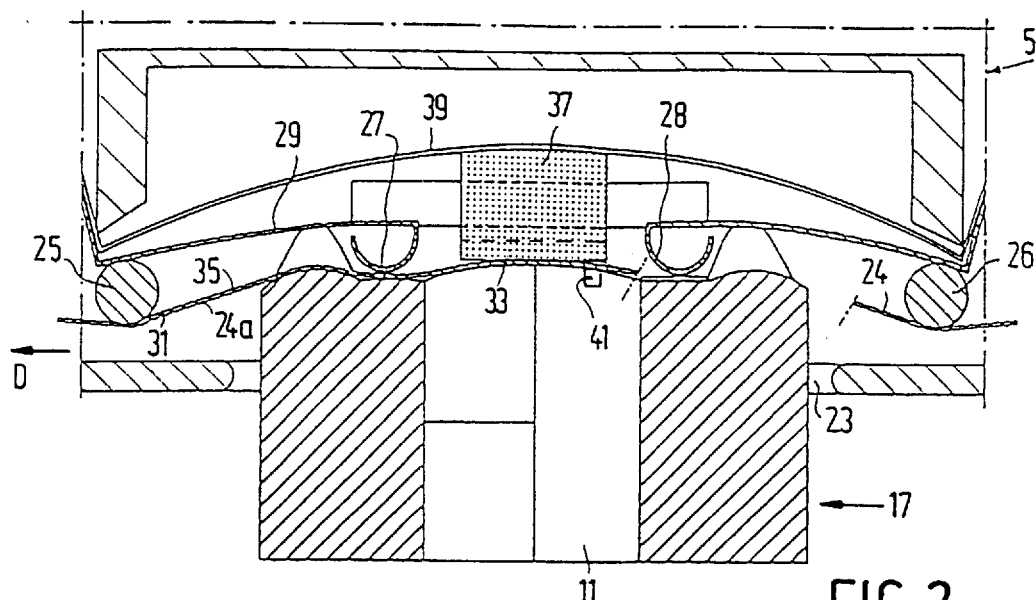
FIG. 2 is a cross-section of a portion of a magnetic tape cassette located proximate to the magnetic head aperture during cooperation with a magnetic head according to the invention.

FIG. 2 shows the cooperation between the DCC cassette 5 provided with the magnetic tape 24 and a magnetic tape unit 17 provided with the magnetic head 11. The cassette 5 has a front wall 19 of a housing 21 (see FIG. 1). The front wall 19 has an aperture 23 for passing the magnetic head unit 17. During scanning, a tape section 24a of the magnetic tape 24 moving in a direction D is guided proximate to the aperture 23 by tape guide pins 25 and 26 which form part of the housing 21, and by tape guides 27 and 28 which form part of a tape guide element 29. A first side 31 of the magnetic tape 24, i.e. the coating side provided with a magnetic layer, engages a contact face 33 of the magnetic head 11 and a second side 35, the rear side, is in contact with a tape pressure element 37 in the form of a pressure felt of a tape pressure element 39 which is present in the housing 21. The tape pressure felt 37 evenly urges the magnetic tape 24 against the contact face 33 of the magnetic head 11 so as to ensure a correct signal transmission. The cassette housing 21 also accommodates a tape cleaning element (not shown in the Figure) for cooperation with the coating side 31 of the magnetic tape.

Figure 3:
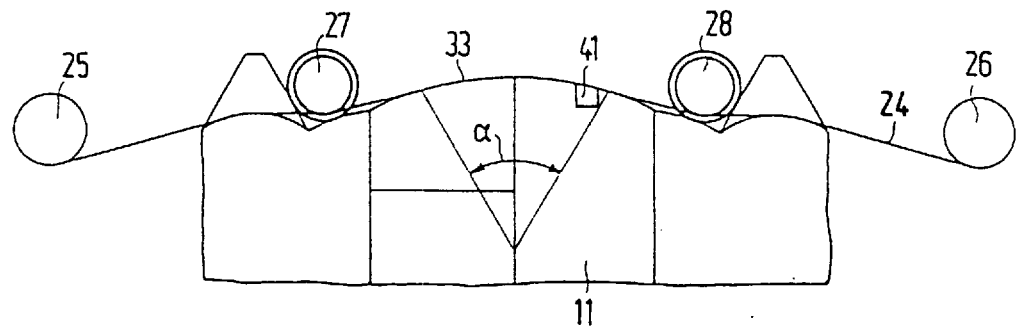
FIG. 3 shows a guide means for a magnetic tape provided with information in a digital form at the location of the magnetic head according to the invention in a recording/reproducing situation.
Figure 4:
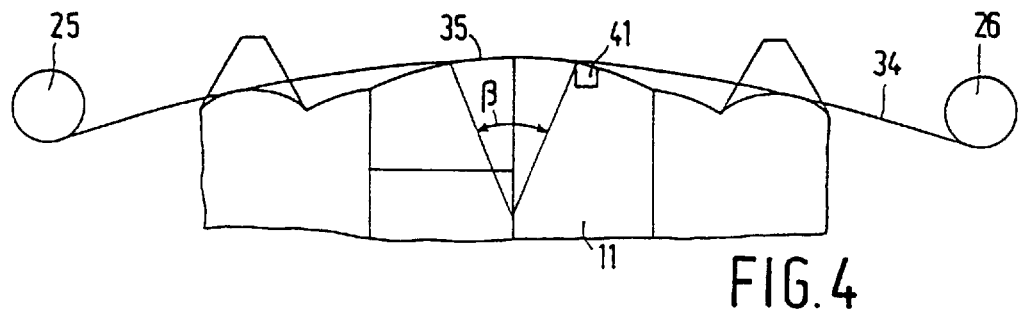
FIG. 4 shows a guide means for a magnetic tape provided with information in an analog form at the location of the magnetic head according to the invention in a recording/reproducing situation.

FIGS. 3 and 4 show the difference in the magnetic head 11 between the contact face 33, which is present when the magnetic tape 24 of the DCC cassette 5 is in the recording/reproducing situation, and a contact face 35, which is present when the magnetic tape 34 of the compact cassette 3 is in the reproducing situation. In the recording/reproducing situation of the magnetic tape 24 shown in FIG. 3, the contact angle is denoted by $\alpha$, while in the reproducing situation of the magnetic tape 34 shown in FIG. 4, the contact angle is denoted by $\beta$. Since the tape guides 27 and 28 are not used when the magnetic tape 34 is being scanned, the angle $\beta$ is considerably smaller than the angle $\alpha$.

Figure 5:
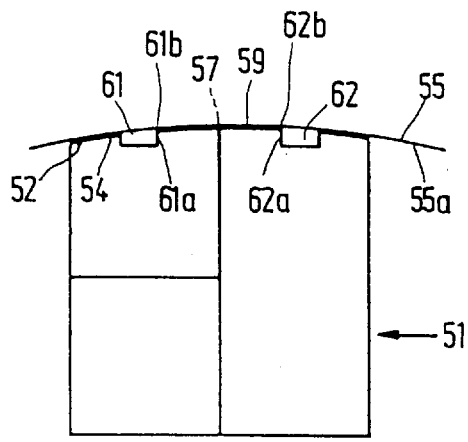
FIG. 5 is a side elevational view of an embodiment of the magnetic head provided with a wear-resistant layer according to the invention.
Figure 6:
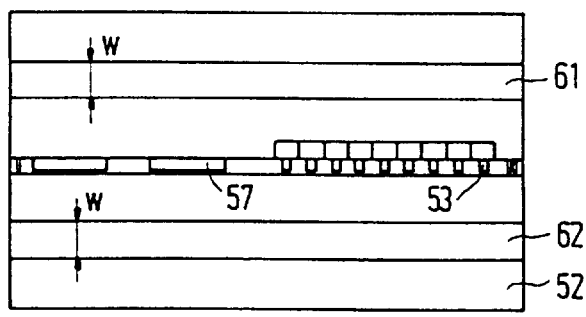
FIG. 6 is a plan view of the magnetic head of FIG. 5, prior to information of the wear-resistant layer.
Figure 7:
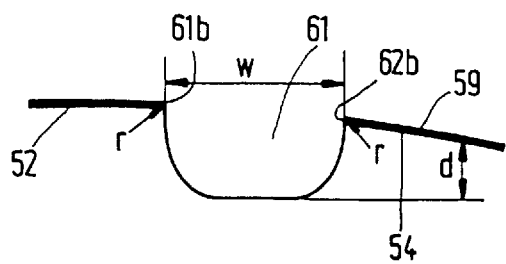
FIG. 7 shows a detail of the magnetic head of FIG. 5.

The magnetic head 51 according to the invention, shown in FIGS. 5, 6 and 7, is made by thin-film techniques and has a transducing structure with nine first transducing gaps 53 for recording and reproducing information in a digital form on and from a magnetic tape 55, and two second transducing gaps 57 for reproducing information in an analog form from a magnetic tape. The magnetic head 51 has a head face 52 formed by grinding and polishing, in which head face two cleaning grooves 61 and 62 are formed, for example, by means of a sawing operation. The cleaning grooves 61 and 62 extend parallel to the transducing gaps 53 and 57, and in this embodiment they have, at least at the contact face 59, a groove width w of approximately 200 $\mu$m extending in the direction of the tape travel. The cleaning grooves 61 and 62 each have wall portions 61a and 62a, respectively, directed approximately transversely to the head face 52. The wall portions 61a and 62a constitute sharp scraping edges 61b and 62b, respectively. After the formation of the cleaning grooves 61 and 62 and after a subsequent lapping operation, for example by means of a lapping tape moving across the head face so as to slightly round the scraping edges 61b and 62b, a wear-resistant layer 54 is provided on the head face 52. In this embodiment the wear-resistant layer 54 is formed by sputtering chromium nitride layer to a layer thickness of approximately 60 nm, and the sharp scraping edges 61b and 62b have a radius of curvature of approximately 3 $\mu$m. The wear-resistant layer 54 constitutes a contact face 59 for a tape face 55a of the magnetic tape 55. The scraping edges 61b and 62b are used for removing agglutinations of dust and/or dirt possibly present on the tape face 55a of the magnetic tape 55 to be scanned. The cleaning grooves have a depth d of approximately 100 $\mu$m, which is sufficient to collect dust and/or dirt which has been scraped off and which is small enough to be easily cleaned, for example by means of a cleaning tape. If desired, a larger depth may be used.

Reverting to FIGS. 1 to 4, it is to be noted that the magnetic head 11 shown in these Figures is provided with one cleaning groove 41 only. The groove 41 has a width ranging between 100 and 300 $\mu$m. As is particularly evident from FIGS. 3 and 4, the cleaning groove 41 is positioned in such a way that it is situated in the contact face 33 but not in the contact face 35. It is thereby achieved that the cleaning groove 41 is only functional during writing and/or reading information in a digital form. In fact, reading information in an analog form is less critical and is thus less affected by dust and dirt on the magnetic tape.

Figure 8:
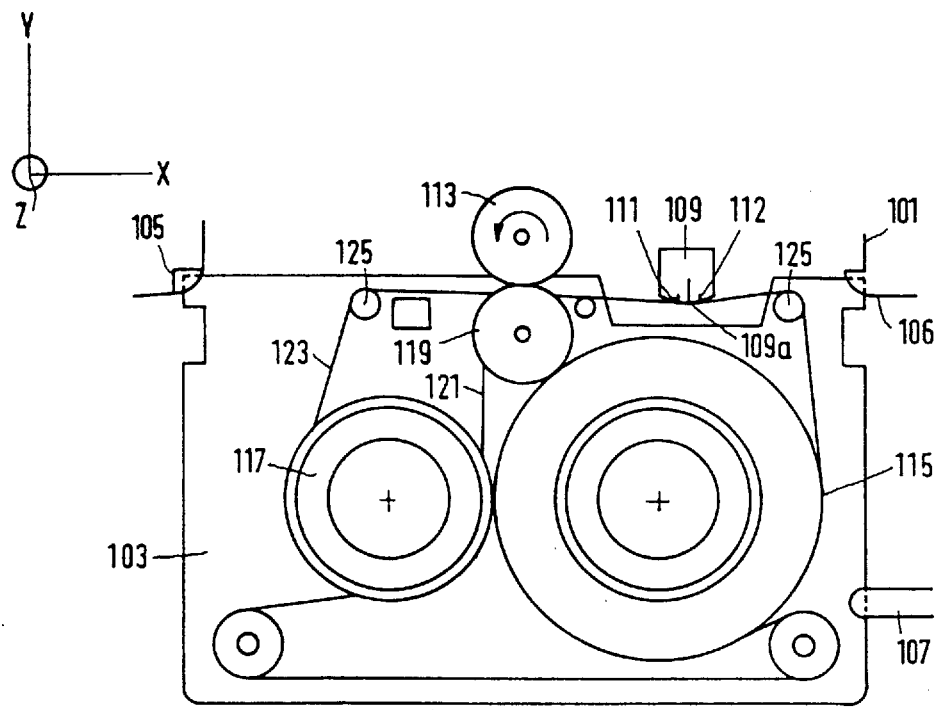
FIG. 8 shows diagrammatically a detail of a second embodiment of the magnetic tape system according to the invention.

The magnetic tape system according to the invention, shown in FIG. 8, comprises a magnetic tape apparatus 101 and a magnetic tape cassette 103. The apparatus 101 has a cassette positioning device 105, 106 and 107 for positioning and retaining the cassette 103 in the XYZ, YZ and Z directions, respectively (see also the XYZ system of coordinates shown). The apparatus further comprises a magnetic head 109 according to the invention, which in this embodiment has two cleaning grooves 111 and 112, and a drive spindle 113. The magnetic head 109 may be displaced in the Y direction in a pivotal or rectilinear manner via a mechanism which is not shown. The cassette 103 has two reels 115 and 117 which are coupled mutually and to a drive wheel 119 by means of a rubber or synthetic material drive belt 121. A quantity of a magnetic tape 123 which is passed via guiding elements 125 along the magnetic head 109 projecting into the cassette 103 during scanning, is provided on the two reels 115 and 117, while the required tape tension is realised by the drive belt 121. The system may also be provided with means for displacing the magnetic head 109 in the Z direction, in which case the cleaning grooves 111 and 112 extend throughout the contact face 109a of the magnetic head 109, viewed in the Z direction.

Figure 9:
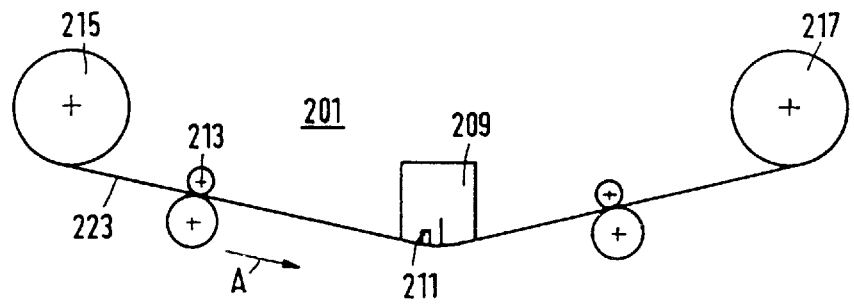
FIG. 9 shows diagrammatically a detail of a third embodiment of such a system.

The magnetic tape system according to the invention, shown diagrammatically in FIG. 9, comprises a magnetic tape apparatus 201 which has two reels 215 and 217 on and between which a magnetic tape 223 is present. The apparatus 201 is further provided with at least one magnetic head 209 having a cleaning groove 211. The magnetic tape running along the magnetic head 209 is passed between a drive roller 213 and a pressure roller 214 for displacing it in the direction shown by way of the arrow A.

I claim:

1. A longitudinal track recording system, comprising a magnetic tape apparatus for use with a magnetic tape having one or more longitudinal recording tracks, the magnetic tape apparatus comprising a multi-gap magnetic head for writing and/or reading the magnetic tape, which magnetic head has a contact face for cooperation with a tape face of the magnetic tape, the head comprising a transducing structure having transducing gaps terminating in the contact face, characterized in that the contact face is provided with at least one cleaning groove for cleaning the tape face, which groove at the contact face has a width dimension of between 100 and 300 $\mu$m and which groove extends at least substantially parallel to the transducing gaps and has at least one wall portion oriented at least substantially transversely to the contact face and constituting a scraping edge at the contact face, which scraping edge has a radius of curvature of between 1 and 5 $\mu$m.

2. A longitudinal track recording system as claimed in claim 1, characterized in that a wear-resistance layer is provided on the contact face of the magnetic head.

3. A longitudinal track recording system as claimed in claim 1, characterized in that the magnetic head transducing gaps comprise first transducing gaps for scanning information in a digital form on a first type of magnetic tape and with second transducing gaps for scanning information in an analog form on a second type of magnetic tape, and in that the cleaning groove is located within a first contact region defined by an angle alpha for the first type of magnetic tape, and in that the cleaning groove is located outside a second contact region defined by an angle beta for the second type of magnetic tape, the angle beta being smaller than the angle alpha.

4. A longitudinal track recording system as claimed in claim 3, and including a magnetic tape cassette containing magnetic tape, characterized in that the magnetic tape cassette is provided with a tape pressure element for urging the magnetic tape against the contact face of the magnetic head.

5. A longitudinal track recording system as claimed in claim 4, characterized in that the magnetic tape apparatus has a drive spindle, the magnetic tape cassette has two reels coupled by a drive belt and a drive wheel for cooperation with the drive spindle, the magnetic tape extending between the two reels.

6. A longitudinal track recording system as claimed in claim 5, characterized in that the magnetic head is moveable with respect to the magnetic tape in a direction transverse to the longitudinal tracks of the magnetic tape, while the cleaning groove extends from a first edge to a second edge of the contact face.

7. A longitudinal track recording system as claimed in claim 5, characterized in that during operation the drive roller moves the magnetic tape in a direction such that the tape first passes the cleaning groove and subsequently the transducing gaps.

8. A longitudinal track recording system as claimed in claim 2, characterized in that the magnetic head transducing gaps comprise first transducing gaps for scanning information in a digital form on a first type of magnetic tape and with second transducing gaps for scanning information in an analog form on a second type of magnetic tape, and in that the cleaning groove is located within a first contact region defined by an angle alpha for the first type of magnetic tape, and in that the cleaning groove is located outside a second contact region defined by an angle beta for the second type of magnetic tape, the angle beta being smaller than the angle alpha.

* * * * *